March 17, 1953 — A. W. ECKSTROM — 2,631,926
APPARATUS FOR CONCENTRATING A SOLUTION
AND SEPARATING CRYSTALS THEREFROM
Filed Oct. 3, 1949 — 3 Sheets-Sheet 2
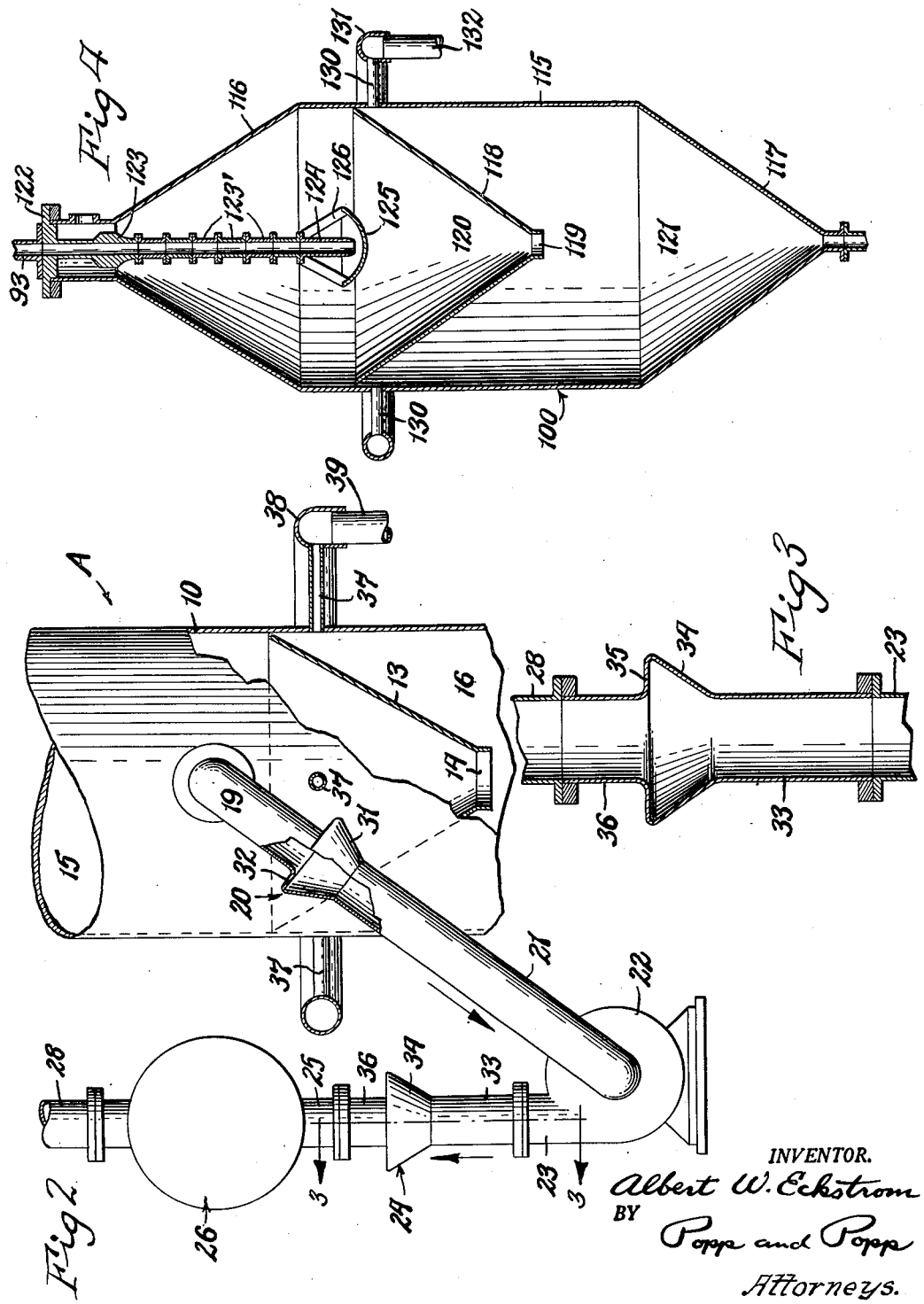
INVENTOR.
Albert W. Eckstrom
BY Popp and Popp
Attorneys.

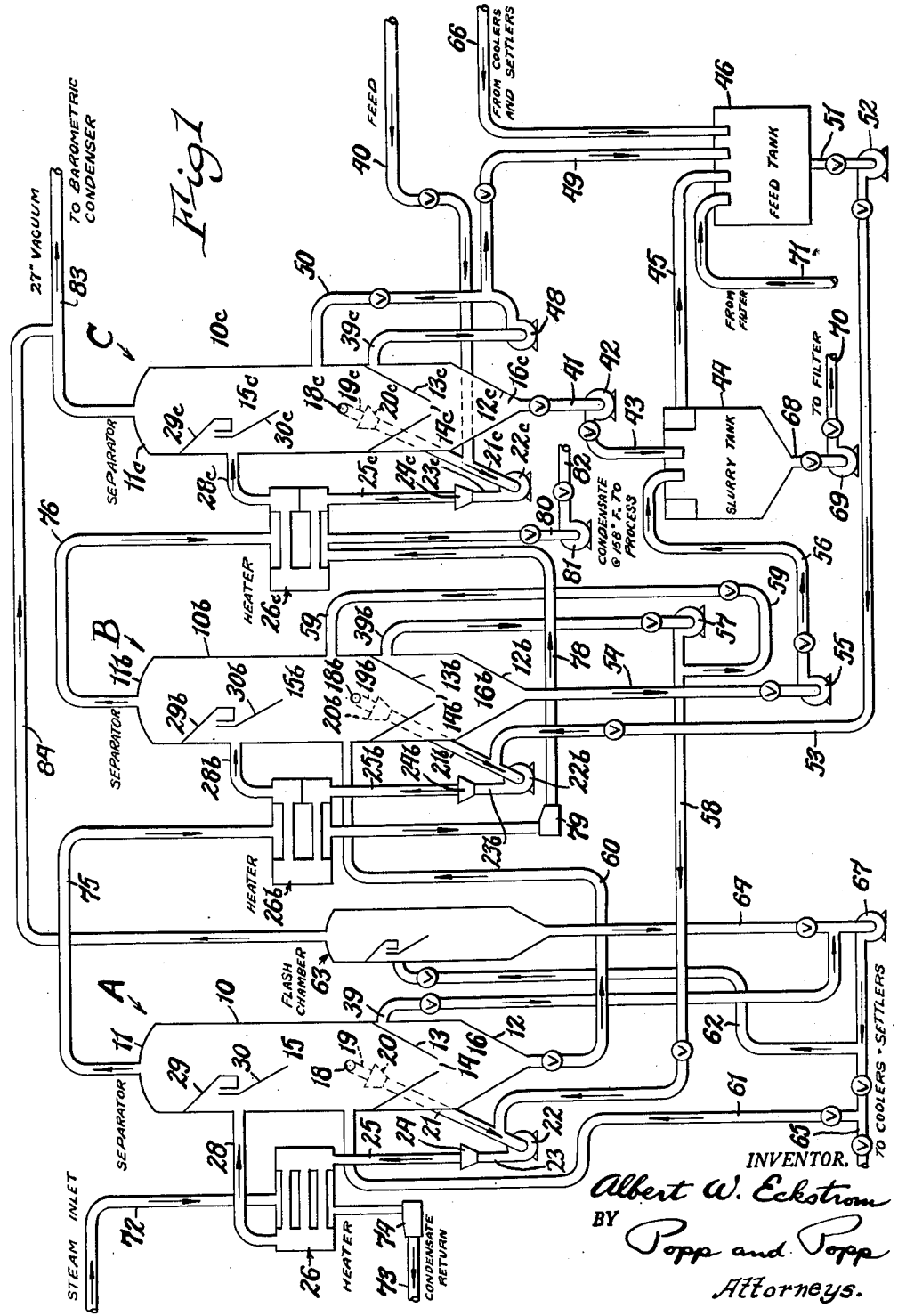
March 17, 1953 — A. W. ECKSTROM — 2,631,926
APPARATUS FOR CONCENTRATING A SOLUTION AND SEPARATING CRYSTALS THEREFROM
Filed Oct. 3, 1949 — 3 Sheets—Sheet 1
INVENTOR.
Albert W. Eckstrom
BY Popp and Popp
Attorneys.

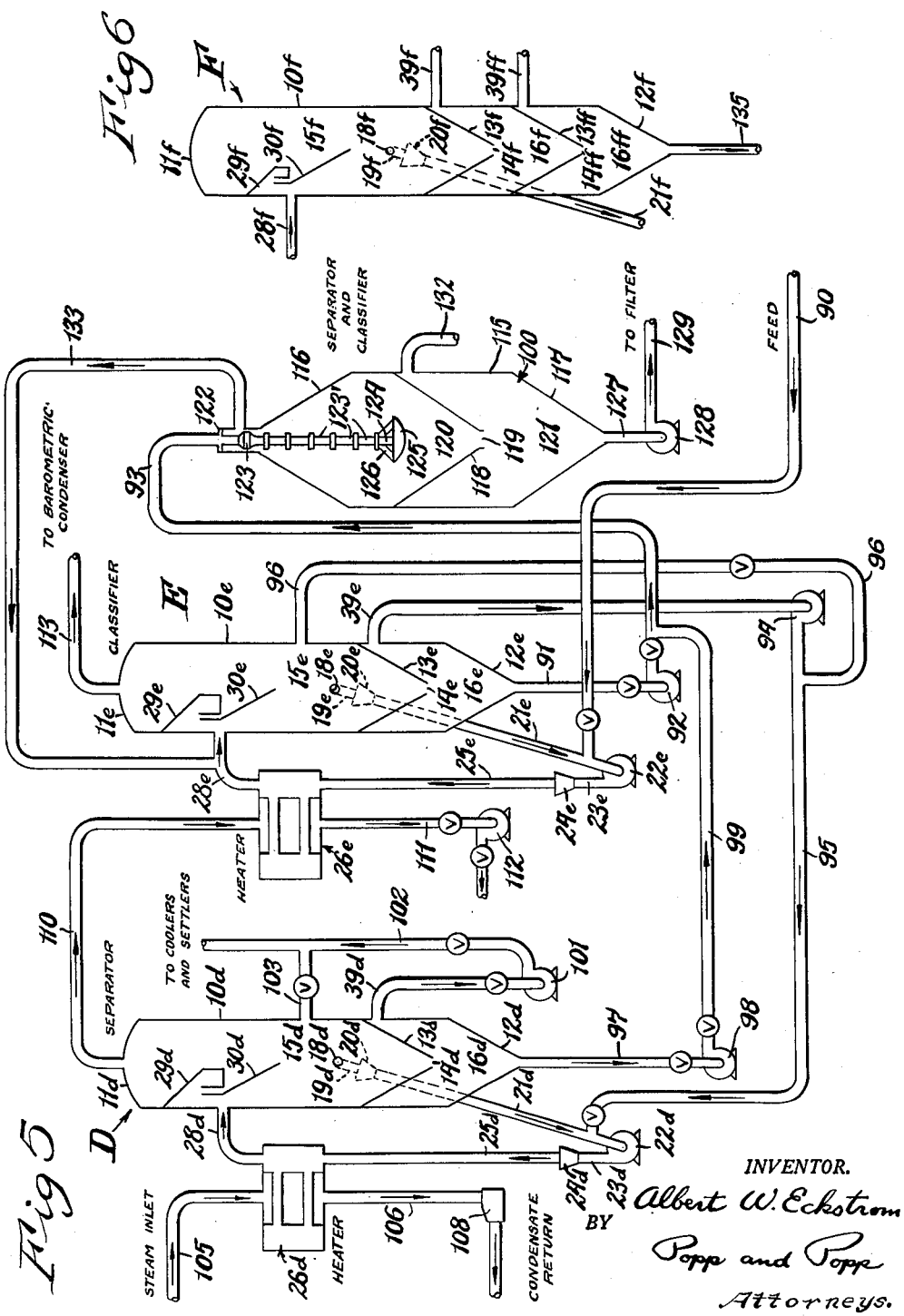

Patented Mar. 17, 1953

2,631,926

UNITED STATES PATENT OFFICE 2,631,926

APPARATUS FOR CONCENTRATING A SOLUTION AND SEPARATING CRYSTALS THEREFROM

Albert W. Eckstrom, Buffalo, N. Y., assignor to Blaw-Knox Company, Pittsburgh, Pa., a corporation of Delaware Application October 3, 1949, Serial No. 119,382

10 Claims. (Cl. 23—273)

This invention relates to apparatus for concentrating a solution and separating crystals therefrom and more particularly to a multiple effect evaporator designed to effect such crystal separation.

While the invention is more particularly described with reference to a backflow multiple effect evaporator for concentrating and removing salt from electrolytic caustic soda cell liquor containing caustic soda, sodium chloride and water, features of the evaporator are equally applicable to forward flow evaporators where the vapor and solution move in the same direction through the multiple effect evaporator in contrast to the countercurrent movement thereof in a backflow evaporator and also to a parallel flow multiple effect evaporator where the solution is fed to and removed from each effect independently of the other effects. Also the invention is applicable to any evaporator where a solution is concentrated and crystals removed therefrom such as in concentrating solutions such as hexamethyltetramine, sodium chloride or sodium sulfate brines, or in the production of glycerine from spent lye in soap plants where the removed salt is recycled to the soap manufacturing process.

One of the principal objects of the present invention is to provide apparatus which is small in size with reference to its capacity, this being particularly important where costly metals, such as stainless steel, are required in the fabrication of the apparatus.

Another important object is the recovery of large crystals in preference to fines and the recycling of fines so as to permit them to grow to the desired size.

Another important object is to provide such apparatus which remains clean and free from crystal deposits throughout.

Another important object is to provide such apparatus in which the concentration and crystal removal is carried out as an automatic, continuous and balanced process and with high steam economy.

Another object is to provide such apparatus in which there is a minimum redissolving or loss of crystals.

Another object is to provide such apparatus in which the residual solution can be removed in a substantially crystal free condition to permit the progress of the solution through the several effects with a minimum disturbance with the separation of the crystals from the solution.

Another object is to provide adequate flow of the solution through the effects to provide effective velocities for classification of the crystals, where desired.

Another object is to provide the above effective velocities for classification and through the heaters independent of, and variable, without affecting the amount of solution advanced from effect to effect and the removal of crystals from each effect.

Another object is to provide in such a multiple effect evaporator, expansion joints for the lines carrying the solution which are free from leakage and also are free from the danger of being rendered inoperative because of the incrustation of crystals thereon.

Another object is to provide a simple form of internal classifier in an evaporator wherein clear concentrated solution, fines and crystals of the desired size are automatically segregated for separate removal.

Other objects and advantages of the invention will appear from the following description and drawings in which:

Fig. 1 is a diagrammatic representation of one form of the present invention for concentrating and removing the salt from electrolytic caustic soda cell liquor.

Fig. 2 is an enlarged fragmentary side elevational view of the first effect shown in Fig. 1 and showing the construction in greater detail.

Fig. 3 is a vertical enlarged section taken on line 3—3, Fig. 2.

Fig. 4 is a vertical section through the separate salt separator and classifier 100, shown in Fig. 5.

Fig. 5 is a view similar to Fig. 1 and showing another form of the invention.

Fig. 6 is a diagrammatic view of a modified form of combined evaporator and classifier capable of being used in the multiple effect evaporators shown in Figs. 1 and 5.

In Fig. 1 is diagrammatically illustrated a backflow triple effect evaporator designed for concentrating electrolytic caustic soda cell liquor. The first, second and third effects of the triple effect evaporator are designated at A, B and C, respectively, each effect being a combined evaporator and salt separator. Since the combined evaporators and salt separators of the several effects are of similar construction, the same reference numerals have been applied and the same description is deemed to apply, the corresponding parts of the effects "B" and "C" being distinguished by the corresponding suffixes "b" and "c."

Each of the effects comprises a vertical tubular shell 10 having a dome shaped upper end head 11 and a funnel-shaped bottom or inverted bottom cone 12. Each shell 10 is also provided with an internal conical partition in the form of an inverted cone 13 secured at its rim to the cylindrical wall of the shell 10 and having an opening 14 at the apex of the inverted cone arranged coaxially of the shell. This internal or upper inverted cone 13 thereby provides an upper evaporating chamber 15 and a lower salt separating chamber 16 in the combined evaporator and salt separator of each effect.

The liquid within the upper evaporating chamber 15 of each effect is continuously recirculated through a heater and for this purpose each shell 10 is provided above the rim of the upper or internal inverted cone 13 with a recirculated liquor outlet 18 connected with a recirculated liquor line 19 extending downwardly to an expansion joint indicated generally at 20, this expansion joint also connecting with the suction line of a pump 22. The outlet 23 of each pump 22 extends vertically upward and connects through an expansion joint 24 with the inlet 25 of a heater 26, the liquor passing through the tubes of this heater and thence through an outlet line 28 into the upper part of the evaporating chamber 15. The discharge of the liquor from the outlet line 28 into the shell 10 is preferably against baffles 29 and 30.

The lines 19 and 21 between the outlet 18 and the inlet of the pump 22 are coaxially disposed at a steep angle and the purpose of the expansion joint 20 is, of course, to permit longitudinal expansion of these lines, the particular feature of each expansion joint being freedom from becoming fouled with salt deposits. To this end each expansion joint 20, as best shown in Fig. 2, comprises a frusto-conical sheet metal portion 31 connected at its smaller rim to one of these lines and connected at its larger rim to a circular sheet metal diaphragm 32 which in turn is centrally connected with and forms an end enlargement on the other of these lines. It will be seen that in effect the expansion joint 20 comprises a cylinder connected at one of its ends to and forming a continuation of the end of the pipe 21, the frusto-conical shell 31 connected at its smaller end to this cylinder and communicating therewith, the flexible diaphragm 32 connected at its margin to the larger rim of the frusto-conical shell and extending radially inwardly therefrom and having a central opening, and a second metal cylinder connected at one end to and forming a continuation of the other pipe 19 and connected at its other end to said diaphragm in registry with said opening.

Preferably, but not necessarily, the expansion joint 20 is positioned as shown so that the diaphragm 32 is uppermost and so there is no tendency for loose salt crystals to collect thereon and the flexing of the diaphragm 32 tends to inhibit the formation of a salt coating thereon and the angularity of the frusto-conical portion of the expansion joint and the velocity of flow of the recirculated liquor tends to inhibit the formation of a salt coating on this portion of the expansion joint.

The expansion joint 24 in the vertical pump discharge leg supporting the heater 26 is shown as being of similar but heavier construction, this expansion joint being shown in Figs. 2 and 3 as comprising a lower tubular portion 33 having its upper end flared outwardly to form an inverted frusto-conical portion 34 and the enlarged end of which extends radially inwardly to form a diaphragm 35 which in turn comprises a radial enlargement of the lower end of a tubular upper portion 36 of the expansion joint. It will be seen that as so constructed the expansion joint 24 functions in the same manner as the expansion joint 20 and that in effect it comprises a metal cylinder 33, 36 connecting the pipes 23, 25 and having intermediate its ends an enlargement in the form of a frusto-conical portion the smaller end of which forms an enlarging continuation of the end 33 of this cylinder and the larger end of which is continued radially inwardly to provide a flexible diaphragm which forms an enlarging continuation of the other end of this cylinder.

The salt crystallizing in the evaporating chamber 15 settles to the upper inverted cone 13 and passes through the opening 14 therein into the separating chamber 16 where it settles to the bottom cone 12 and forms a bed thereon. The clear liquor is withdrawn from the upper part of the separating chamber adjacent the large rim of the upper cone, preferably through a plurality of outlet nipples 37, such as the four indicated in Fig. 2 and leading to a common circular manifold 38 surrounding the shell 10 and having an outlet line 39.

The feed liquor from the electrolytic cell comprising, say, about 10% caustic soda, 15% sodium chloride and 75% water is supplied from a feed line 40 to the suction line 21c of the recirculating pump 22c of the third effect C. The salt, which forms a bed on the lower cone or bottom 12c of the salt separating chamber 16c of this third effect is withdrawn through an outlet line 41 by a pump 42 and discharged through a line 43 into a slurry tank 44, the overflow from which passes through an overflow line 45 to a feed tank 46. The relatively clear liquor outlet line 39c of this third effect connects with the inlet of a pump 48, one outlet branch 49 of which discharges into the feed tank 46 and another outlet branch 50 of which returns a part of the relatively clear solution to the evaporating chamber 15c of the third effect below the level of the solution therein.

The liquor in the feed tank 46 is withdrawn through an outlet line 51 by a pump 52 and discharged through a line 53 to the suction line 21b of the second effect B. The salt forming in this effect and which forms a bed on the lower cone or bottom 12b of the salt separating chamber 16b of this second effect is withdrawn through an outlet line 54 by a pump 55 and discharged through a line 56 into the slurry tank 44.

The clear liquor outlet line 39b connects with the inlet of a pump 57 the outlet line 58 of which discharges into the suction line 21 of the first effect A. A branch line 59 also connects the outlet of this pump 57 with the evaporating chamber 15b below the level of the liquid therein.

The salt forming in this first effect A as a bed on the lower cone of bottom 12 of the salt separating chamber 16 of this first effect A is withdrawn through an outlet line 60 by the reduced pressure which obtains in the second effect B, this salt being discharged into the evaporating chamber 15b of this second effect.

The clear liquor outlet line 39 of the first effect A connects with the inlet of a pump 67. One branch 61 of the outlet from this pump returns a part of this liquor to the evaporating chamber 15 of this first effect. Another branch 62 of the outlet from the pump 67 delivers a part of this liquor to a flash chamber 63. A return liquor line 64 connects the lower end of this flash chamber 63 with the pump 67. The third branch 65 from the pump 67 discharges into the coolers and settlers (not shown). The return liquor line 66 from these coolers and settlers discharges into the feed tank 46.

The salt formed in the second and third effects B and C and collected in the slurry tank 44 is withdrawn through its outlet line 68 by a pump 69 and discharged through a line 70 to a filter (not shown). The liquor return line 71 from this filter discharges into the feed tank 46.

The first or high pressure effect A is heated by steam supplied from a steam line 72 to the heater 26 through which the liquor in the first effect is recirculated. The condensate from this steam heater 26 returns to the boiler (not shown) through a condensate return line 73 and steam trap 74.

The vapor generated in the evaporating chamber 15 of this first effect A escapes through a vapor outlet line 75 and is condensed in the heater 26b through which the solution in the second effect B is recirculated. The vapor generated in the evaporating chamber 15b of this second effect B escapes through a vapor outlet line 76 and is condensed in the heater 26c through which the liquor in the third effect C is recirculated. This heater 26c is also heated by the condensate from the heater 26b, this condensate being supplied through a line 78 and steam trap 79. This steam trap permits of maintaining a pressure differential in effects A and B, more specifically a lower pressure in effect B than in effect A, while providing for the use of both the condensate from effect A and the low pressure vapor from effect B in the heater 26c of effect C. The condensate from the heater 26c is drawn through a suction line 80 of a condensate pump 81 the outlet line 82 of which can return this condensate to the steam boiler (not shown).

The vapor generated in the evaporating chamber 15c of the third effect C passes through a vapor line 83 leading to a barometric condenser (not shown) and which maintains a vacuum in this third effect C as well as in the flash chamber 63 through its vapor line 84.

In the operation of the evaporating system shown in Figs. 1–3 in concentrating electrolytic caustic soda cell liquor comprising, say, about 10% caustic soda, 15% sodium chloride, and 75% water, and such concentration requiring the crystallization and removal of the salt for reuse as well as the evaporation of the water, the cell liquor from the feed line 40 is fed to the suction line 21c of the circulating pump 22c of the third effect C. This cell liquor, together with the solution withdrawn from the evaporating chamber 15c of this third effect through the outlet 18c and recirculated liquor line 19c, is circulated through the tubes of the heater 26c, the heated liquor from the tubes of this heater being discharged through the line 28c into the upper part of the evaporating chamber 15c above the level of the liquid therein and some of which flashes to produce evaporation and salt crystals on entering this evaporating chamber, the balance traveling downwardly to join the body of solution maintained in the evaporating chamber 15c of this third effect. The vapor is so generated at, say, a 27 inch vacuum in the evaporating chamber 15c, this vacuum being maintained by a barometric condenser (not shown) connected with the vapor outlet line 83 of this third effect C and in which this vapor is condensed.

In this third effect C the caustic soda is brought to its first stage of concentration and since the size of the crystals formed is in inverse ratio to the concentration of the caustic, the largest crystals tend to form in this third effect as compared with the second and first effects. The magma in the evaporating chamber 15c comprises crystals varying in size from the fine crystals initially formed on flashing of the solution on discharge into this chamber from the line 15c to larger and more readily filtered crystals. The fines in this magma are kept in suspension by the recirculation of the solution through the heater 26c by the recirculating pump 22c and in being so recirculated through this heater and being held in suspension in the evaporating chamber 15c they are given a chance to grow and gradually increase in size.

As the crystals so grow to the desired more readily filtered size they tend, to a greater degree than the fines, to settle into the internal inverted cone or conical baffle 13c and in travelling downwardly these larger crystals plus some fines pass through the opening 14c at the bottom of this internal cone into the separating chamber 16c. The larger crystals passing through the opening 14c continue to descend in this separating chamber 16c and build up as a bed on the conical bottom 12c of the shell. This bed of crystals is continuously withdrawn as a slurry through the outlet line 41 by the pump 42 and discharged into the slurry tank 44 where the crystals again settle and are withdrawn by the pump 69 to the filter (not shown). This slurry discharged by the pump 42 into the slurry tank 44 serves to dilute the concentration of the liquid adhering to the crystals coming to this slurry tank 44 through line 56 from the effect B, as hereinafter described. The overflow from the slurry tank 44 passes through the line 45 to the feed tank 46.

The relatively clear solution from the separation chamber 16c is withdrawn from immediately under the large upper end of the internal cone 13c through the outlet line 39c by the pump 48, this withdrawal preferably being through a plurality of outlets and through the annular manifold similar to the outlets 37 and manifold 38 as shown in Fig. 2. The increase in velocity of the liquid flowing toward the outlet 39c, due to the progressively increasing restriction provided by the inverted cone 13c, has a tendency to carry fine crystals along if they do not settle immediately when the liquid enters the separating chamber 16c. A part of this relatively clear solution is recirculated by the pump 48 through the line 50 back to the evaporating chamber 15c and is discharged below the level of the solution therein. The other part of this relatively clear solution is discharged by the pump 48 through the line 49 to the feed tank 46. The solution from the filters (not shown) which filter the fully developed crystals discharged by the pump 69 from the third effect C is also returned to this feed tank 46 through the line 71 and since this feed tank supplies the solution to the next or second effect B, it will be seen that all of the clear solution from the third effect C passes to the next effect B; the magma in the evaporating chamber 15c is recirculated through the heater 26c wholly independently of the movement of solution into and through the separating chamber 16c and to supply the necessary heat for concentrating and flashing the solution, as well as to permit growth of the fines to more readily filtered size; and the pump 48 recirculates a sufficient quantity of the solution through the evaporating chamber 15c and the separating chamber 16c to maintain the proper crystal separation velocity as well as to discharge relatively clear solution to the feed tank 46 for subsequent concentration in the preceding effects.

With particular reference to the recirculation of the solution and fines in the evaporating chamber 15c through the heater 26c the velocity in this heater and in the evaporating chamber 15c is therefore independent of the operation of the effect as a salt separator. This heater is heated by the vapor from the preceding effect, which can be assumed to be at a temperature of 158° F., and by the condensate from the heater of the preceding effect B and for the concentration of caustic soda cell liquor at a 27 inch vacuum is preferably of such size in relation to the velocity of the solution passing therethrough as to heat the solution to from 141–145° F. At such temperatures the amount of heat is added to the solution recirculated through the evaporating chamber 15c to obtain the desired amount of vapor, a temperature differential and velocity through the tubes is provided which prevents boiling in the tubes, and at the same time a relatively low temperature drop is established at the flash, a reduced temperature differential at the flash being desirable to reduce the violence of the flash. The velocity and temperature rise in the heater 26c also depends on the character of the material being concentrated, some salts having a solubility which increases with rising temperature and hence tending to dissolve on heating and other salts, such as sodium sulfate, having a solubility which decreases with rising temperature so that the velocity must be sufficient to prevent deposit of precipitated salt on the tubes of the heater.

The flow of the solution through the effect C, as well as through the effect B, is determined by the demand of the next effect. On the other hand the desired degree of separation or classification in the effect C is determined by the velocity of the solution passing through the opening 14c of the internal cone 13c. To obtain the desired separation or classification in the effect C independently of the demand of the next effect B, the pump 48 withdrawing the clear solution for transfer to the next effect recirculates a part of this clear solution through the line 50 back to the evaporating chamber 15c so as to maintain the desired velocity through the cone opening 14c. This provision for recirculation of solution from the separating chamber 16c to the evaporating chamber 15c is essential in controlling the size of the crystals which are allowed to settle through the cone opening 14c. Also the required velocity below the internal cone 13c for proper classification depends on the concentration of the solution, specific gravity and nature of the product. The velocity below the internal cone 13c must therefore be adjusted to obtain the desired degree of classification. Where this required velocity provides more discharge than the amount demanded by the next effect, the excess discharge must be recirculated back to the evaporating chamber 15c as through the line 50. While with caustic soda cell liquor, substantially complete separation of the salt crystals is desirable in the third effect C, the velocity at the internal cone opening 14c must be sufficient to provide for removal of the desired quantity of crystals from the evaporating chamber 15c and under such conditions some fines are usually carried through the outlet line 39c. With some materials a carry over of fines to the next effect is desirable and under such conditions the effect C would act as a classifier rather than as a separator.

The solution in the feed tank 46, which is, of course, of higher caustic concentration and lower salt concentration than the cell liquor, is pumped by pump 52 through the line 53 into the suction line 21b of the circulating pump 22b of the second effect B. This solution from the feed tank 46, together with the solution withdrawn from the evaporating chamber 15b of this second effect through the outlet 18b and recirculated solution line 19b, is circulated through the tubes of the heater 26b, the heated solution from the tubes of this heater being discharged through the line 28b into the upper part of the evaporating chamber 15b above the level of the liquid therein and some of which flashes to produce evaporation and salt crystals on entering this evaporation chamber, the balance traveling downwardly to join the body of solution maintained in the evaporating chamber 15b. The vapor generated in this evaporating chamber 15b escapes through the vapor line 76 to condense in and heat the heater 26c, this heater also being heated by the condensate from the heater 26b. To maintain the assumed vapor temperature of approximately 158° F. in the evaporating chamber 15b, the heater 26b would be supplied with vapor from the first effect A at a temperature of approximately 212° F. and a vacuum of approximately 20¾″ would be maintained in the evaporating chamber 15b.

As with the third effect C, the fines in the magma are kept in suspension by the recirculation of the solution through the evaporating chamber 15b by the recirculating pump 22b and are given the opportunity to grow into more readily filtered crystals which settle downwardly through the internal cone opening 14b. Since the crystal size decreases with increased caustic soda concentration, these crystals settling into the separating chamber 16b are smaller than those similarly separated in the effect C, but as with the effect C the recirculation of the fines through the evaporating chamber 15b and heater 26b is independent of the salt separating function of this effect B. Also as with the effect C the heater 26b is designed to add the amount of heat necessary to obtain the desired amount of vapor from the effect B; to provide such temperature differential and velocity through the tubes as to prevent boiling in the tubes; and also to provide a relatively low temperature drop at the flash.

The more readily filtered crystals settling through the internal cone opening 14b build up as a bed on the conical bottom 12b and are withdrawn as a slurry through the outlet 54 by the pump 55 and discharged through the line 56 into the slurry tank 44, joining the slurry from the effect C for filtration as previously described. As previously noted the liquid adhering to this slurry discharged through the line 56 is diluted in the slurry tank 44 by the liquid of the slurry coming through line 43 from effect C.

The relatively clear solution from the separation chamber 16b is withdrawn from immediately under the large upper end of the internal cone 13b through the outlet line 39c by the pump 57, this withdrawal preferably being through a plurality of outlets and through an annular manifold similar to the outlets 37 and manifold 38 shown in Fig. 2. A part of this relatively clear solution is recirculated by the pump 57 through the line 59 back to the evaporating chamber 15b and is discharged below the level of the liquid therein. The balance of this relatively clear solution discharged by the pump 57 is conducted directly into the suction line 21 of the circulating pump 22 of the first effect A.

As with the third effect C, the recirculation of a part of the discharge from the pumps 55 and 57 controls the size of the crystals which are allowed to pass through the internal cone opening 14b independently of the rate of withdrawal of the solution from the settling chamber 16b and which is determined by the demand of the effect A, the size of the crystals passing through the internal cone opening 14b being determined by the velocity of the solution flowing therethrough. This recirculation of solution through the line 59 also determines the size of the crystals permitted to escape through the line 39b from the separating chamber 16b where operation of the effect B as a classifier is desired. Such classification is determined by the velocity through the separating chamber 16b and by recirculation of a part of the discharge of the pump 57 through the line 59, this classification also being influenced by the rate of withdrawal of the slurry by the pump 55. Such classification is rendered independent of the demand of the first effect A.

The solution from the line 58 from the second effect B, together with the solution withdrawn from the evaporating chamber 15 of the first effect A through the outlet 18 and recirculated liquor line 19, is circulated through the tubes of the heater 26, the heated solution from the tubes of this heater being discharged through the line 28 into the upper part of the evaporating chamber 15 above the level of the liquid therein and some of which flashes to produce evaporation and salt crystals on entering this evaporation chamber, the balance traveling downwardly to join the body of solution maintained in this evaporating chamber. The vapor generated in this evaporating chamber 15 escapes through the vapor line 75 to condense in and heat the heater 26b. To maintain the assumed vapor temperature of approximately 212° F. in the evaporating chamber 15, the heater 26 would be supplied with steam from the steam inlet 72 at a temperature of about approximately 337° F. and an approximate zero pounds pressure gauge would be maintained in the evaporating chamber, 15.

As with the second and third effects B and C, the fines in the magma are kept in suspension by the recirculation of the solution through the evaporating chamber 15, by the recirculating pump 22 and are given the opportunity to grow as much as possible into more readily filtered crystals which settle downwardly through the internal cone opening 14. Since crystal size decreases with increased caustic soda concentration, these crystals settling into the separating chamber 16 are considerably smaller and much smaller in amount than those similarly separated in the effects B and C, but as with these effects the recirculation of the fines through the evaporating chamber 15 and heater 26 is independent of the salt separating function of this effect A. In the effect A, the concentration of the caustic is normally about 50% which makes the crystals much smaller and also most of the crystals settle out in the effect B which leaves a much smaller amount to be removed from effect A. Also as with the effects B and C the heater 26 is designed to add the amount of heat necessary to obtain the desired amount of vapor from the effect A; to provide such temperature differential and velocity through the tubes as to prevent boiling in the tubes; and also to provide a relatively low temperature drop at the flash.

The crystals settling through the internal cone opening 14 build up as a bed on the conical bottom 12 and are withdrawn as a slurry through the outlet 60 by the lower pressure in the evaporating chamber 15b of the effect B and drawn into this evaporating chamber. These crystals so discharged from the effect A into the effect B build up in size in the lower concentration caustic soda solution in the effect B and are withdrawn as a slurry from this effect, as previously described.

The relatively clear solution from the separator chamber 16 is withdrawn from immediately under the large upper end of the internal cone 13 through the outlets 37, manifold 38 and outlet line 39 by the pump 67. This solution is mixed with additional solution of lower temperature withdrawn from the flash chamber 63 to reduce its temperature and a part of this mixture is recirculated through this flash chamber 63 and which is maintained under a 27 inch vacuum through the vapor line 84 connecting with the barometric condenser (not shown). So reducing the temperature of the solution before flashing in the flash chamber 63 reduces the violence of the flash. This flashing in the flash chamber 63 cools the solution and causes some further crystallization of the salt. Part of the cooled solution with such salt crystals is discharged by the pump 67 through the line 65 to coolers and settlers (not shown) for further separation and settling of the crystals. After such cooling and settling, which is incomplete, the solution is filtered to remove fine crystals in suspension. The caustic solution crystals from the coolers, settlers and filters are preferably returned to the feed tank 46 and pass through the multiple effect evaporator along with the solution supplied to this feed tank as previously described.

At the start of operation, a part of the discharge from the pump 67 is returned through line 61 to the evaporating chamber 15 of the first effect A until the desired final concentration is reached. However, during operation the valve in this line 61 is closed inasmuch as complete crystal separation as possible is desired in this effect and the crystal separation is not affected by the demand of any subsequent effect. Accordingly a recirculation of the leaving relatively clear solution through the evaporation chamber 15 is not required as with the other effects B and C.

With particular reference to the expansion joints shown in detail in Figs. 2 and 3, the normal type of stuffing box as used on salt evaporators is subject to continual leakage and under certain conditions the crystallization of the salt between the slip tube and packing renders it doubtful whether the slip tube moves at all. The common type diaphragm expansion joint has never been used, due to the fact that the salt collects between the two diaphragms and, when it hardens, destroys the effect of the expansion joint.

The particular feature of the two forms of expansion joints shown is that they are non-clogging and can be used safely where crystal bearing liquids pass through the tubes connected thereby. With either expansion joint 20 or 24 arranged as shown, the circular diaphragm permits free axial expansion and contraction of the connected pipes toward and from each other, and since this diaphragm is in motion and especially since its internal face faces downwardly there is no tendency for the salt to cake on the diaphragm. Also there is no tendency for the salt to settle and cake on the frusto-conical part of either diaphragm especially since the same is subject to the liquid flow. While the expansion joint is preferably arranged as shown, with the diaphragm above and the frusto-conical portion below, the expansion joint can be reversed since even if some of the crystals settle out in the corner between the diaphragm and frusto-conical portion, the motion of the diaphragm is sufficient to prevent these crystals from caking and rendering the expansion joint inoperative.

A modified form of evaporator for concentrating electrolytic caustic soda cell liquor and crystallizing and removing the sodium chloride therefrom is shown in Figs. 4 and 5, this being in the form of a backflow double effect evaporator. In this form of the invention the first effect D has an internal separator for the salt crystals and the second effect E has an internal classifier for the salt crystals. Since the combined evaporator and salt separator of each of these effects are of the same construction as the combined evaporator and salt separator in each effect A, B and C of the form of the invention shown in Figs. 1–3, the same reference numerals have been applied and distinguished by the suffixes "d" and "e," and this description is not repeated.

The electrolytic caustic soda cell liquor comprising a solution of caustic soda, sodium chloride and water is supplied from a feed line 90 to the suction line 21e of the second effect E. The salt, which forms a bed on the lower cone or bottom 12e of the salt separating chamber 16e of this second effect is withdrawn through an outlet line 91 by a pump 92 and discharged through a line 93 into a separate separator and classifier indicated generally at 100. The solution outlet line 39e of this second effect, and through which a solution containing fine salt crystals is discharged from under the internal cone 13e connects with the inlet of a pump 94 one outlet branch 95 of which discharges into the suction line 21d of the recirculating pump 22d of the first effect D, and another outlet branch 96 of which returns a part of the withdrawn solution to the evaporating chamber 15e of the second effect below the level of the solution therein.

In the first effect D, the salt crystals form a bed on the lower cone or bottom 12d of the salt separating chamber 16d of this first effect and these crystals are withdrawn as a slurry through an outlet line 97 by a pump 98 and discharged through a line 99 into the line 93 carrying the salt crystal slurry from the second effect E to the separate separator and classifier indicated at 100.

The clear liquor outlet line 39d of this first effect connects with the inlet of a pump 101 the outlet 102 of which can conduct the concentrated caustic solution to coolers and settlers (not shown). A recirculation branch 103 also connects the outlet of this clear liquor pump 101 with the evaporating chamber 15d. This line 103 is only opened at the start of operation, however.

The first effect D is heated by steam supplied from a steam line 105 to the heater 26d through which the liquor in the first effect is recirculated.

The condensate from this heater 26d returns to the boiler (not shown) through a condensate return line 106 and steam trap 108.

The vapor generated in the evaporating chamber 15d of this first effect D escapes through a vapor outlet line 110 and is condensed in the heater 26e through which the solution in the second effect E is recirculated. The condensate from this heater 26e is removed through a condensate outlet line 111 by a condensate pump 112.

The vapor generated in the evaporating chamber 15e of this second effect E passes through a vapor outlet line 113 leading to a barometric condenser (not shown) and which maintains a vacuum in this evaporating chamber 15e of this second effect.

The separate classifier and separator indicated generally at 100 is in the form of a vertical tubular shell 115 having a conical upper end head 116 which converges upwardly and a funnel-shaped bottom or inverted bottom cone 117. The shell is also provided with an internal conical partition in the form of an inverted cone 118 secured at its rim to the cylindrical wall of the shell 115 and having an opening 119, at the apex of the inverted cone arranged coaxially of the shell. This internal or upper inverted cone thereby provides an upper chamber 120 and a lower chamber 121.

The salt slurry delivered to the classifier and separator 100 from each effect D and E through the pipe 93 is delivered through the apex of the upper end head 116 this head having for this purpose a cap 122 to which the line 93 is connected and through a central opening in which the slurry is delivered to an internal vertical pipe section 123 depending from this cap 122 as best shown in Fig. 4. This vertical pipe section is continued in a plurality of additional depending pipe sections 123' each of which is flanged at its opposite ends and is removably suspended from the next higher section in any suitable manner. It will be seen that the effective length of the pipe 123, 123' can be increased or decreased by increasing or decreasing the number of sections 123'.

The sectional pipe 123, 123' terminates in a downwardly directed nozzle 124 suspended by an upper flange from the bottom flange of the lowermost pipe section 123' and this nozzle discharges against a baffle 125. This baffle is shown as being in the form of a segment of a sphere with its concave side facing upwardly and is shown as suspended from the upper flange of the nozzle 124 by hanger straps 126 or in any other suitable manner.

The salt of a size determined by the operation of the classifier and separator is withdrawn as a slurry from the bottom of the inverted conical bottom 117 through an outlet line 127 and is discharged by a pump 128 through an outlet line 129, to the usual filter (not shown). The clear liquor is withdrawn from the chamber 121 directly under the large rim of the internal cone 118, preferably through an annular series of outlets 130 connecting with an annular manifold 131. The clear solution so withdrawn can be returned through a line 132 to the process at any suitable point. Solution bearing fine crystals escapes from the top of the chamber 120 through a line 133 and is returned to the solution being recirculated through the second effect E.

In the operation of the backflow double effect system shown in Figs. 4 and 5 in concentrating electrolytic caustic soda cell liquor comprising, say, about 10% caustic soda, 15% sodium chloride, and 75% water, and removal of the salt for reuse being required as well as evaporation of the water, the cell liquor from the feed line 90 is fed to the suction line 21e of the circulating pump 22e of the second effect E. This cell liquor, together with the solution withdrawn from the evaporating chamber 15e of this second effect through the outlet 18e and recirculated liquor line 19e, is circulated through the tubes of the heater 26e, the heated liquor from the tubes of this heater being discharged through the line 28e into the upper part of the evaporating chamber 15e above the level of the liquid therein and some of which flashes to produce evaporation and salt crystals on entering this evaporating chamber, the balance traveling downwardly to join the body of solution maintained in the evaporating chamber. The vapor is so generated at, say, a 27 inch vacuum in the evaporating chamber 15e, this vacuum being maintained by a barometric condenser (not shown) connected with the vapor outlet line 113 of this second effect and in which this vapor is condensed.

In this second effect E the caustic soda is brought to its first stage of concentration and since the size of the salt crystals formed is in inverse ratio to the concentration, the largest crystals tend to form in this effect as compared with the first effect. The fines in the magma in the evaporating chamber 15e are kept in suspension by the recirculation of the solution through the heater 26e by the recirculating pump 22e and in being so recirculated through this heater and being held in suspension in the evaporating chamber 15e they are given a chance to grow and gradually increase in size.

As the crystals so grow to the desired more readily filtered size they settle into the internal inverted cone or conical baffle 13e and in so traveling downwardly pass through the opening 14e at the bottom of this internal cone into the separating chamber 16e. These more readily filtered crystals continue to descend in the separating chamber 16e and build up as a bed on the conical bottom 12e of the shell. This bed of crystals is continuously withdrawn as a slurry through the outlet line 91 by the pump 92 and discharged into the separate classifier and separator 100.

The solution from the separation chamber 16e containing fines below classified size is withdrawn from immediately under the large upper end of the internal cone 13e through the outlet line 39e by the pump 94. A part of this solution containing fines is recirculated by the pump 94 through the branch 96 back to the evaporating chamber 15e and is discharged below the level of the liquid therein. The balance of this solution containing fines discharged by the pump 94 is conducted directly into the suction line 21d of the circulating pump 22d of the first effect D.

As with the second and third effects B and C of the form of the invention shown in Figs. 1 and 2, the recirculation of a part of the discharge from the pump 94 controls the size of the crystals which are allowed to settle through the internal cone opening 14e independently of the rate of withdrawal of the solution from the settling chamber 16e and which is determined by the demand of the effect D, the size of the crystals passing through the internal cone opening being determined by the velocity of the solution flowing therethrough. This recirculation of solution through the line 96 also determines the size of the crystals permitted to escape through the line 39e from the separating chamber 16b, the effect E operating as a classifier. Such classification is determined by the velocity through the separating chamber 16e and by recirculation of a part of the discharge through the line 96. Such classification is rendered independent of the demand of the first effect D.

The solution from the line 95 from the second effect E, together with the solution withdrawn from the evaporating chamber 15d of the first effect D through the outlet 18d and recirculated liquor line 19d is circulated through the tubes of the heater 26d, the heated solution from the tubes of this heater being discharged through the line 28d into the upper part of the evaporating chamber 15d above the level of the liquid therein and some of which flashes to produce evaporation and salt crystals on entering this evaporation chamber, the balance traveling downwardly to join the body of solution maintained in this evaporating chamber. The vapor generated in this evaporating chamber 15d escapes through the vapor line 110 to condense in and heat the heater 26e. The heater 26d is supplied with steam from the steam line 105.

As with the second effect E, the fines in the magma are kept in suspension by the recirculation of the solution through the evaporating chamber 15d by the recirculating pump 22d and are given the opportunity to grow into more readily filtered crystals which settle downwardly through the internal cone opening 14d. Since crystal size decreases with increased caustic soda concentration, these fully developed crystals settling into the separating chamber 16 are smaller than those similarly separated in the effect E, but as with this effect the recirculation of the fines through the evaporating chamber 15d and heater 26d is independent of the salt separating function of this effect D. Also as with the effect E the heater 26d is designed to add the amount of heat necessary to obtain the desired amount of vapor from the effect D; to provide such temperature differential and velocity through the tubes as to prevent boiling in the tubes; and also to provide a relatively low temperature drop at the flash.

The more readily filtered crystals settling through the internal cone opening 14d build up as a bed on the conical bottom 12d and are withdrawn as a slurry by the pump 98 and added to the slurry from effect E being fed to the separate classifier and separator 100.

The relatively clear solution from the separating chamber 16d is withdrawn from immediately under the large upper end of the internal cone 13d through the outlet line 39d by the pump 101 and can be passed to coolers and settlers (not shown). The recirculation line 103 is only opened at the start of operation in building up the concentration of the caustic solution in the effect D and during operation this line 103 is closed inasmuch as complete crystal separation is desired in this effect and the crystal separation is not affected by the demand of any subsequent effect.

The crystals from both effects D and E are pumped through the classifier and separator 100, the slurry passing down through the sectional pipe 123, 123' and being deflected laterally on entering the chamber 120 by the baffle 125. In this chamber 120 the coarser crystals settle and pass through the opening 119 of the internal cone 118 into the chamber 121 where they settle to the bottom 117 and are withdrawn by the pump 128 for filtration or other processing. The clear solution is withdrawn from the chamber 121 from under the upper end of the internal cone 118 through the outlets 130 manifold 131 and outlet line 132 and can be returned to the process. Fines of smaller than predetermined size are withdrawn with the solution from the upper part of the chamber 120 through the line 133 and mixed with the solution being recirculated through the second effect E.

The purpose of the sectional pipe 123, 123' in the classifier and separator 100 is to permit of controlling the size of the crystals permitted to settle through the internal cone opening 119 to be withdrawn by the pump 128 and the size of the crystals which are recirculated through the line 133. By decreasing the number of sections 123', the discharge point or nozzle 124 can be raised and the minimum velocity of the solution rising in the chamber 120 can be increased to control the size of the crystals which are allowed to settle and those which are recirculated. This minimum velocity is a function of the position of the nozzle 124 and deflector 125 with reference to the cone 116. In Fig. 4 the nozzle 124 and deflector 125 are shown at substantially their lowest position. As the nozzle 124 and deflector 125 are raised, the initial upward velocity of the solution discharged therefrom becomes greater, approaching as a limit the outlet velocity at the apex of the cone 116. With the nozzle 124 and deflector 125 at or above the base of the cone 116, the solution discharged from this nozzle and deflector and rising in the cone 116 never slows up, but moves faster as it approaches the apex of the cone 116. The elevation of this nozzle and deflector above the base of the cone 116 to determine the initial velocity of the solution rising in the cone 116 thereby essentially determines the minimum upward velocity of this rising solution and thereby the degree to which it holds fines in suspension.

In the event that a secondary separation is required in any evaporator, a combined evaporator and classifier constructed in accordance with Fig. 6 can be provided. As there shown the evaporator, indicated generally at F, is similar to the combined evaporators and separators or classifiers A through E and hence the same reference numerals have been employed and distinguished by the suffix "f." For the secondary separation an additional inverted internal cone 13ff is provided in the separating chamber 16f, this being of similar construction to the inverted internal cone 13f providing a secondary separating chamber 16ff therebelow. Immediately below the large upper end of the secondary inverted cone 13ff, an outlet 39ff is provided through the shell 10f and through which clear liquor is drawn off. It will be seen that the combined evaporator and classifier F shown in Fig. 6 operates in the same manner as any of those comprising the effect A through E except that with the added inverted internal cone 13ff and outlet 39ff, clear liquor is drawn off through this outlet line 39ff fines are drawn off through the line 39f, and salt crystals of larger size through the outlet 135. The flow of liquid drawn off through the lines 39f and 39ff is, of course, determined by the pumps (not shown) connected with these lines when incorporated in a complete system as shown in Figs. 1 and 5.

From the foregoing it will be seen that the present invention provides a compact, high capacity multiple effect evaporator in which the crystals are separated as large crystals and which accomplishes the various objects set forth. It will be appreciated that in concentrating other solutions from which crystals are formed many modifications would be made in the apparatus and operation as described and the invention is therefore to be accorded the full range of equivalents comprehended by the accompanying claims. In particular, in practice any other temperature distribution may be established by change in the relative heating surfaces and also by change in the heat transfer rates as they vary for different concentrations and different products. As examples of such modifications for other products, in the concentration of sodium chloride brines containing a considerable percentage of impurities, a back flow arrangement similar to Fig. 1 would be used to advantage in combination with a classifier 100 as shown in Fig. 5 for final classification of the crystals from the second and third effect before filtration or centrifuging. Also in the concentration of sodium chloride and sodium sulfate brines containing little, if any, impurities, the parallel flow arrangement could be used by feeding the brine separately to the various effects and discharging the crystal slurries withdrawn from the bottom of the separators into a common slurry tank, thereby eliminating the cross connections from one effect to another, since in this case there is no need for discharge of any concentrated liquor from the first effect and concentrations in the various effects are not greatly different. Further when concentrating glycerine containing salt, a back flow arrangement again would be preferred. Internal separators would be used in only those effects in which salt crystals separate. These can be further classified in a separator 100.

I claim:

1. Apparatus for concentrating a solution and separating crystals therefrom, comprising a vertical shell, a generally conical partition in said shell and dividing said shell into an upper evaporating chamber partly filled with said solution and a lower separating chamber, said conical partition being arranged with its wall converging downwardly to an opening providing communication between said chambers and through which crystals formed in said evaporating chamber settle into said separating chamber, a heater, lines for circulating the solution from the lower part of said evaporating chamber through said heater and back into said evaporating chamber above the level of the liquid therein to flash on discharge into the evaporating chamber, a pump recirculating the solution through said lines, heater and evaporating chamber, a liquid outlet line connected to withdraw the solution from the upper part of said separating chamber immediately below the large upper end of said conical partition, and a crystal outlet line connected to the bottom wall of said separating chamber to withdraw the crystals settling therein.

2. Apparatus for concentrating a solution and separating crystals therefrom, comprising a vertical shell, a generally conical partition dividing said shell into an upper evaporating chamber partly filled with said solution and a lower separating chamber, said conical partition being arranged with its wall converging downwardly to an opening providing communication between said chambers and through which crystals formed in said evaporating chamber settle into said separating chamber, a recirculating pump, an inlet line connecting the inlet of said recirculating pump with the lower part of said evaporating chamber to withdraw the solution therefrom, an outlet line connecting the outlet of said recirculating pump with said evaporating chamber above the level of the solution therein, a heater in one of said lines to heat the solution recirculated by said pump to flash on discharge from said outlet line into said evaporating chamber, a feed line connected to supply feed solution to said inlet line, a liquid outlet line connected to withdraw the solution from the upper part of said separating chamber below the large upper end of said conical partition, and a crystal outlet line connected to the bottom wall of said separating chamber to withdraw the crystals settling therein.

3. Apparatus for concentrating a solution and separating crystals therefrom, comprising a vertical shell, a generally conical partition dividing said shell into an upper evaporating chamber partly filled with said solution and a lower separating chamber, said conical partition being arranged with its wall converging downwardly to an opening providing communication between said chambers and through which crystals formed in said evaporating chamber settle into said separating chamber, a recirculating pump, an inlet line connecting the inlet of said recirculating pump with the lower part of said evaporating chamber to withdraw the solution therefrom, an outlet line connecting the outlet of said recirculating pump with said evaporating chamber above the level of the solution therein, a heater in one of said lines to heat the solution recirculated by said pump to flash on discharge from said outlet line into said evaporating chamber, a feed line connected to supply feed solution to said inlet line, a liquid outlet line connected to withdraw the solution from the upper part of said separating chamber below the large upper end of said conical partition, a second pump in said liquid outlet line, a crystal outlet line connected to the bottom wall of said separating chamber to withdraw the crystals settling therein and another line connecting the outlet of said second pump with said evaporating chamber to return a part of the solution so withdrawn from the upper part of said separating chamber to said evaporating chamber.

4. Apparatus for concentrating a solution and separating crystals therefrom, comprising a vertical shell, a pair of generally conical partitions arranged in vertically spaced relation in the lower part of said shell and dividing said shell into an evaporating chamber arranged above the upper partition and partly filled with said solution, a classifying chamber arranged intermediate said partitions and a separating chamber arranged below the lower partition, each of said conical partitions being arranged with its wall converging downwardly to an opening providing communication between the adjacent chambers and through which crystals formed in said evaporating chamber settle through said classifying and separating chambers, a heater, lines for circulating the solution from the lower part of said evaporating chamber through said heater and back into said evaporating chamber above the level of the liquid therein to flash on discharge into the evaporating chamber, a pump recirculating the solution through said lines, heater and evaporating chamber, a crystal outlet line connected to the bottom wall of said separating chamber to withdraw the crystals settling therein, a liquid outlet line connected to withdraw the solution containing fine crystals from the upper part of said classifying chamber immediately below the large upper end of said upper partition, and another liquid outlet line connected to withdraw the clear solution from the upper part of said separating chamber immediately below the large upper end of said lower partition.

5. In a multiple effect evaporator for concentrating a solution and separating crystals therefrom, each effect comprising an enclosed vertical shell having a vapor outlet at its upper end and a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a heater associated with each effect, lines connected to withdraw the solution from each effect from the lower part of its evaporating chamber above its conical partition and to pass the solution through the corresponding heater and to return the heated solution to the upper part of the evaporating chamber of the same effect, a conduit connected to supply an external heating medium to the heater of the first effect, a conduit connecting the heater of each subsequent effect with the vapor outlet of the preceding effect, a liquid outlet line connected to withdraw the solution in each effect from the upper part of its separating chamber below the large upper end of said conical partition, a crystal outlet line connected to the bottom wall of the separating chamber of each effect to withdraw the crystals settling therein, a feed line connected to feed said solution to said effects, and another line connected to return a part of the solution so withdrawn from the upper part of the separating chamber of at least one of said effects to the evaporating chamber of that effect.

6. In a multiple effect evaporator for concentrating a solution and separating crystals therefrom, each effect comprising an enclosed vertical shell having a vapor outlet at its upper end, a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a recirculating pump, a recirculated solution inlet line connecting the inlet of said pump with the lower part of said evaporating chamber to withdraw the solution therefrom, a recirculated solution return line connecting the outlet of said recirculating pump with said evaporating chamber above the level of the solution therein, and a heater in one of said lines through which the solution recirculated by said recirculating pump is recirculated whereby said solution flashes on discharge from said return line into said evaporating chamber, a conduit connected to supply an external heating medium to said heater of the first effect, a conduit connecting said heater of each subsequent effect with the vapor outlet of the preceding effect, a solution feed line connected to said recirculated solution inlet line of each effect, a crystal outlet line connected to the bottom wall of the separating chamber of each effect to withdraw the crystals settling therein, and a liquid outlet line connected to withdraw the solution in each effect from the upper part of its separating chamber below the large end of said conical partition.

7. In a multiple effect evaporator for concentrating a solution and separating crystals therefrom, each effect comprising an enclosed vertical shell having a vapor outlet at its upper end, a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a recirculating pump, a recirculated solution inlet line connecting the inlet of said pump with the lower part of said evaporating chamber to withdraw the solution therefrom, a recirculated solution return line connecting the outlet of said recirculating pump with said evaporating chamber above the level of the solution therein, and a heater in one of said lines through which the solution recirculated by said recirculating pump is recirculated whereby said solution flashes on discharge from said return line into said evaporating chamber, a conduit connected to supply an external heating medium to said heater of the first effect, a conduit connecting said heater of each subsequent effect with the vapor outlet of the preceding effect, a solution feed line connected to said recirculated solution inlet line of each effect, a crystal outlet line connected to the bottom wall of the separating chamber of each effect to withdraw the crystals settling therein, a liquid outlet line connected to withdraw the solution in each effect from the upper part of its separating chamber below the large end of said conical partition and a line connected to conduct said withdrawn solution from at least one effect to said solution feed line of another effect.

8. In a multiple effect evaporator for concentrating a solution and separating crystals therefrom, each effect comprising an enclosed vertical shell having a vapor outlet at its upper end, a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a recirculating pump, a recirculated solution inlet line connecting the inlet of said pump with the lower part of said evaporating chamber to withdraw the solution therefrom, a recirculated solution return line connecting the outlet of said recirculating pump with said evaporating chamber above the level of the solution therein, and a heater in one of said lines through which the solution recirculated by said recirculating pump is recirculated whereby said solution flashes on discharge from said return line into said evaporating chamber, a conduit connected to supply an external heating medium to said heater of the first effect, a conduit connecting said heater of each subsequent effect with the vapor outlet of the preceding effect, a solution feed line connected to said recirculated solution inlet line of each effect, a crystal outlet line connected to the bottom wall of the separating chamber of each effect to withdraw the crystals settling therein, a liquid outlet line connected to withdraw the solution in each effect from the upper part of its separating chamber below the large end of said conical partition and a line connected to conduct a part of said withdrawn solution from at least one effect to the evaporating chamber of that effect and another part of said withdrawn solution from that effect to said solution feed line of another effect.

9. In a multiple effect evaporator for concentrating a solution and separating crystals therefrom, each effect comprising an enclosed vertical shell, having a vapor outlet at its upper end, a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a recirculating pump, a single recirculated solution inlet line connecting the inlet of said recirculating pump with the lower part of said evaporating chamber to withdraw the solution therefrom, a recirculated solution return line connecting the outlet of said recirculating pump with said evaporating chamber above the level of the solution therein, a heater in one of said lines through which the solution recirculated by said recirculating pump is recirculated whereby said solution flashes on discharge from said return line into said evaporating chamber, a conduit connected to supply an external heating medium to said heater of one of said effects, a conduit conducting the vapor from said vapor outlet of one of said effects through said heater of the other effect to heat the solution flowing therethrough, a solution feed line connected to said inlet line of said other effect, a liquid outlet line connected to withdraw the solution from the upper part of said separating chamber below the large upper end of the conical partition of said other effect and to conduct it to said inlet line of said one of said effects, a liquid outlet line connected to withdraw the solution from the upper part of said separating chamber below the large upper end of the conical partition of said one of said effects, and a crystal outlet line connected to the bottom wall of each of said separating chambers to withdraw the crystals settling therein.

10. In a multiple effect evaporator for concentrating a solution and separating crystals therefrom, each effect comprising an enclosed vertical shell having a vapor outlet at its upper end, a generally conical partition in said shell and dividing said shell into an upper evaporating chamber partly filled with solution and a lower separating chamber, said conical partition being arranged with its wall converging downwardly to an opening providing communication between said chambers and through which crystals formed in said evaporating chamber settle into said separating chamber, a recirculating pump, a recirculated solution inlet line connecting the inlet of said pump with the lower part of said evaporating chamber to withdraw the solution therefrom, a recirculated solution return line connecting the outlet of said recirculating pump with said evaporating chamber above the level of the solution therein and a heater in one of said lines through which the solution recirculated by said recirculating pump is recirculated whereby said solution flashes on discharge from said return line into said evaporating chamber, a conduit connected to supply an external heating medium to said heater of the first effect, a conduit connected to conduct through said heater of each subsequent effect the vapor generated in the preceding effect, a solution feed line connected to said recirculated solution inlet line of each effect, a crystal outlet line connected to the bottom wall of the separating chamber of each effect to withdraw the crystals settling therein, a liquid outlet line connected to withdraw solution in each effect from the upper part of its separating chamber below the large end of said conical partition, the solution withdrawn from at least one effect being substantially free from crystals, and a conduit connected to transfer said substantially crystal free solution to said solution feed line of another effect.

ALBERT W. ECKSTROM.

REFERENCES CITED

The following references are of record in the file of this patent:

UNITED STATES PATENTS

| Number | Name | Date |
|---|---|---|
| 378,843 | Lillie | Feb. 28, 1888 |
| 1,006,823 | Block | Oct. 24, 1911 |
| 1,331,373 | Prache | Feb. 17, 1920 |
| 1,860,741 | Jeremiassen | May 31, 1932 |
| 1,927,555 | Oetken | Sept. 19, 1933 |
| 2,042,661 | Jeremiassen | June 2, 1936 |
| 2,187,030 | Hinckley | Jan. 16, 1940 |
| 2,330,221 | Kermer | Sept. 28, 1943 |
| 2,352,038 | Toeke | June 24, 1944 |
| 2,375,922 | Jeremiassen | May 15, 1945 |
| 2,418,800 | Wilson | Apr. 8, 1947 |
| 2,489,844 | Zallea | Nov. 29, 1949 |